US007629950B2

(12) United States Patent
Yoo

(10) Patent No.: US 7,629,950 B2
(45) Date of Patent: Dec. 8, 2009

(54) GAMMA REFERENCE VOLTAGE GENERATING CIRCUIT AND FLAT PANEL DISPLAY HAVING THE SAME

(75) Inventor: Young-Wook Yoo, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 749 days.

(21) Appl. No.: 11/311,692

(22) Filed: Dec. 20, 2005

(65) Prior Publication Data

US 2006/0244692 A1 Nov. 2, 2006

(30) Foreign Application Priority Data

May 2, 2005 (KR) ..................... 10-2005-0036701

(51) Int. Cl.
*G09G 3/30* (2006.01)
*H04N 5/202* (2006.01)

(52) U.S. Cl. ............................ 345/76; 345/82; 345/84; 345/87; 345/89; 345/204; 348/671; 348/674

(58) Field of Classification Search .................. 345/55, 345/76, 77, 82, 84, 87, 89, 204, 205, 211, 345/690; 348/571, 671, 674
See application file for complete search history.

(56) References Cited

U.S. PATENT DOCUMENTS

| | | | | |
|---|---|---|---|---|
| 5,251,017 | A * | 10/1993 | Riviere | 348/674 |
| 5,940,058 | A * | 8/1999 | Koyama | 345/89 |
| 6,313,884 | B1 * | 11/2001 | Van Endert | 348/674 |
| 6,677,923 | B2 * | 1/2004 | Kajihara et al. | 345/89 |
| 6,778,161 | B2 * | 8/2004 | Chen et al. | 345/89 |
| 7,030,842 | B2 * | 4/2006 | Ha et al. | 345/76 |
| 7,095,395 | B2 * | 8/2006 | Bu | 345/89 |
| 7,388,592 | B2 * | 6/2008 | Chuang et al. | 345/690 |

FOREIGN PATENT DOCUMENTS

| | | |
|---|---|---|
| JP | 52071132 | 6/1977 |
| JP | 55101989 | 8/1980 |
| JP | 61015197 | 1/1986 |
| JP | 61033091 | 2/1986 |
| JP | 02004290 | 1/1990 |
| JP | 04097218 | 3/1992 |
| JP | 06168207 | 6/1994 |
| JP | 09197368 | 7/1997 |

(Continued)

*Primary Examiner*—My-Chau T Tran
(74) *Attorney, Agent, or Firm*—H.C. Park & Associates, PLC

(57) ABSTRACT

A gamma reference voltage generating circuit minimizes voltage fluctuation to output a stable reference voltage and a flat panel display has such a gamma reference voltage generating circuit. The gamma reference voltage generating circuit comprises a resistor array including a plurality of resistors that are connected in series between two supply voltages with different voltage levels. The resistor array divides a voltage between the two supply voltages through the plurality of resistors and outputs the divided voltages. The gamma reference voltage generating circuit further comprises a plurality of first capacitors that are connected between common nodes that are respectively disposed between pairs of adjacent resistors, and one of the two supply voltages. In addition, a plurality of second capacitors are respectively connected in parallel to the respective resistors to stabilize the gamma reference voltages.

20 Claims, 7 Drawing Sheets

FOREIGN PATENT DOCUMENTS

| | | |
|---|---|---|
| JP | 2000193932 | 7/2000 |
| JP | 2002366112 | 12/2002 |
| JP | 2003157051 | 5/2003 |
| JP | 2003233356 | 8/2003 |
| JP | 2004333911 | 11/2004 |
| WO | 9602865 | 2/1996 |

* cited by examiner

GAMMA REFERENCE VOLTAGE GENERATING CIRCUIT AND FLAT PANEL DISPLAY HAVING THE SAME

CROSS-REFERENCE TO RELATED APPLICATION

This application claims priority to and the benefit of Korean Patent Application No. 10-2005-0036701, filed on May 2, 2005, in the Korean Intellectual Property Office, the disclosure of which is incorporated in its entirety by reference as if fully set forth herein.

BACKGROUND OF THE INVENTION

1. Field of the Invention

The present invention relates to a gamma reference voltage generating circuit and a flat panel display having the same. In particular, the present invention relates to a gamma reference voltage generating circuit that minimizes voltage fluctuation to output a stable gamma reference voltage, and a flat panel display having the gamma reference voltage generating circuit.

2. Description of the Background

Flat panel displays have been used widely as displays for personal computers, mobile communication terminals, etc. Recently, studies on displays that use light emitting diodes (LED), such as an organic light emitting display (organic EL), are actively underway. Since the organic EL does not require a backlight, which causes the increase in thickness and weight, and it has a high-speed response, it is suitable for reproducing moving images.

FIG. 1 schematically illustrates an example of a conventional organic EL.

Referring to FIG. 1, the organic EL includes a display panel 11, a scan driver 12, and a data driver 13, wherein a plurality of data lines D[1] through D[m] are arranged in a vertical direction and a plurality of scan lines S[1] through S[n] are arranged in a horizontal direction on the display panel 11.

Also, at least one pixel is formed at intersections of the data lines D[1] through D[m] and scan lines S[1] through S[n]. Each pixel includes a pixel circuit 14 therein.

The pixel circuit 14 includes a transistor, a capacitor, and an organic light-emitting device (OLED). In general, the organic EL allows the OLED to emit light by adjusting a voltage between the source and gate of a driving transistor using a data signal supplied from the data driver 13 to flow the corresponding current to the OLED.

The data driver 13 receives a gamma reference voltage and a digital gray-level data signal and converts the digital gray-level data signal into an analog gray-level data signal to drive the display panel.

FIG. 2 is a circuit diagram that illustrates an example of a conventional gamma reference voltage generating circuit.

Referring to FIG. 2, in the conventional gamma reference voltage generating circuit, a plurality of resistors R1 through RN (N is an integer) are connected in series between two supply voltages. A plurality of capacitors C1 through C(N-1) are respectively connected between common nodes that are respectively disposed between pairs of adjacent resistors R1 through RN, and one of the two supply voltages. Generally, one of the supply voltages is a supply voltage Vcc which is a positive high voltage and the other is a ground voltage GND which is a low supply voltage.

The gamma reference voltage generating circuit constructed as described above divides a voltage between the two supply voltages into smaller voltages through the resistors R1 through RN. It then outputs the divided voltages as gamma reference voltages to the data driver 13. However, due to the resistance load of the data driver 13, the resulting gamma reference voltages may become unstable and may fluctuate, for example.

Since an unstable gamma reference voltage may cause a variation in a data signal that is applied to the pixel circuit 14, gray-levels of an image to be displayed may be represented correctly. This problem is particularly significant for data signals with fewer bits that operate at a high speed during digital to analog (D/A) conversion, which deteriorates the picture quality of the organic EL screen.

SUMMARY OF THE INVENTION

The present invention provides a gamma reference voltage generating circuit that reduces the probability of error generation when representing gray-levels, by outputting stable gamma reference voltages.

Additional features of the invention-will be set forth in the description which follows, and in part will be apparent from the description, or may be learned by practice of the invention.

The present invention discloses a gamma reference voltage generating circuit that drives a panel using a gamma-corrected data signal, comprising a resistor array including a plurality of resistors that are connected in series between two supply voltages with different voltage levels, divide a voltage between the two supply voltages through the plurality of resistors, and output the divided voltages, a plurality of first capacitors that are respectively connected between common nodes that are respectively disposed between pairs of adjacent resistors and one of the two supply voltages, and a plurality of second capacitors that are respectively connected in parallel to the respective resistors to stabilize the gamma reference voltages.

The present invention also discloses a flat panel display comprising a display panel including a plurality of pixels and pixel circuits respectively formed in the regions of the pixels for representing gray-levels according to data signals transferred to the pixel circuits. The display also includes a gamma reference voltage generating circuit that generates a gamma reference voltage to drive the display panel according to a gamma-corrected data signal and a data driver that receives the gamma reference voltage and gray-level data and outputs a data signal for driving the display panel. The gamma reference voltage generating circuit comprises a resistor array including a plurality of resistors that are connected in series between two supply voltages with different voltage levels. The resistor array divides a voltage between the two supply voltages through the plurality of resistors and the gamma reference voltage generating circuit outputs the divided voltages. The gamma reference voltage generating circuit further comprises a plurality of first capacitors that are respectively connected between common nodes that are respectively disposed between pairs of adjacent resistors, and one of the two supply voltages. In addition, the gamma reference voltage generating circuit comprises a plurality of second capacitors that are respectively connected in parallel to the respective resistors to stabilize the gamma reference voltages.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
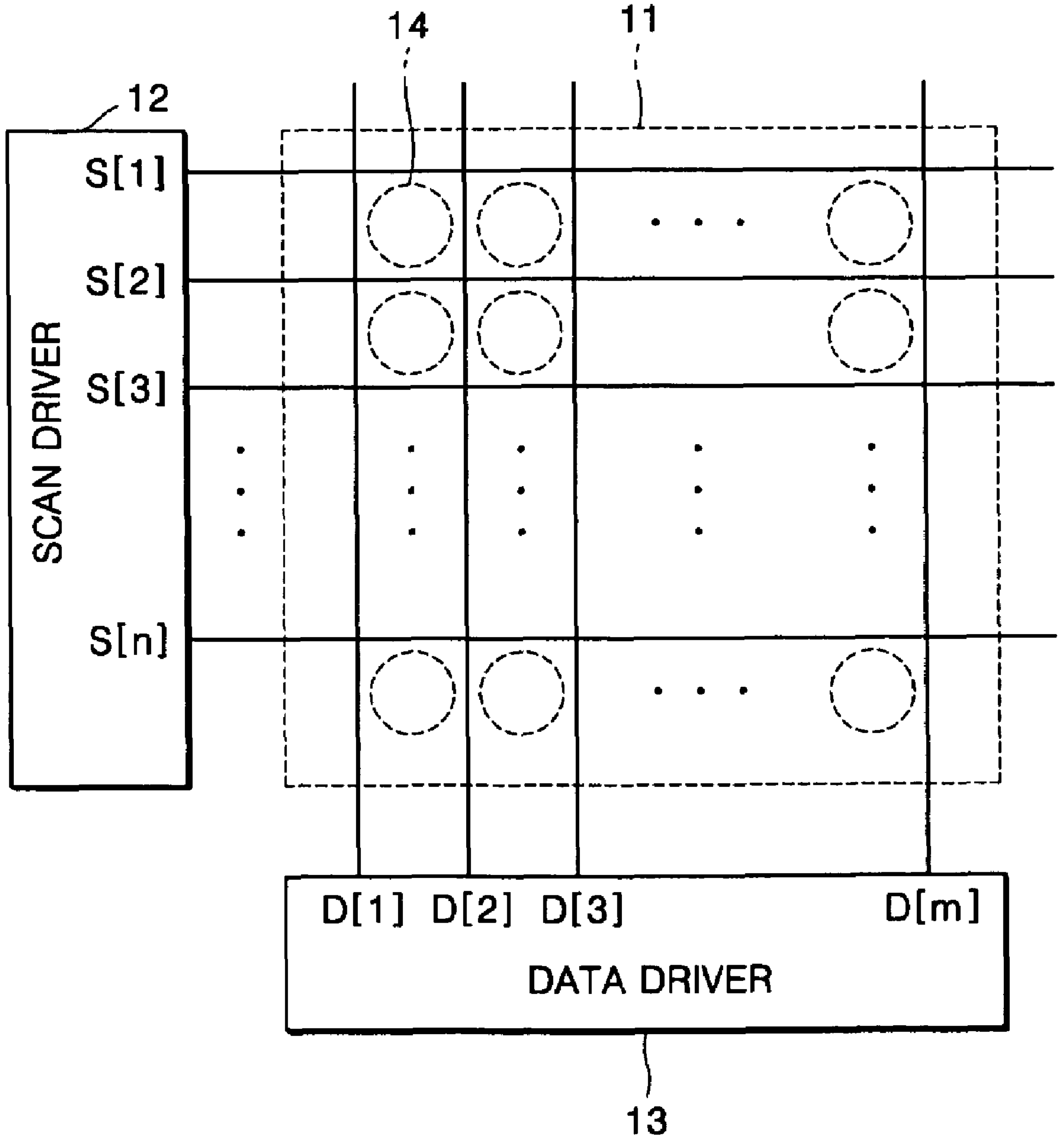
FIG. 1 (PRIOR ART)
FIG. 1 schematically illustrates an example of a conventional organic EL.
Figure 2:
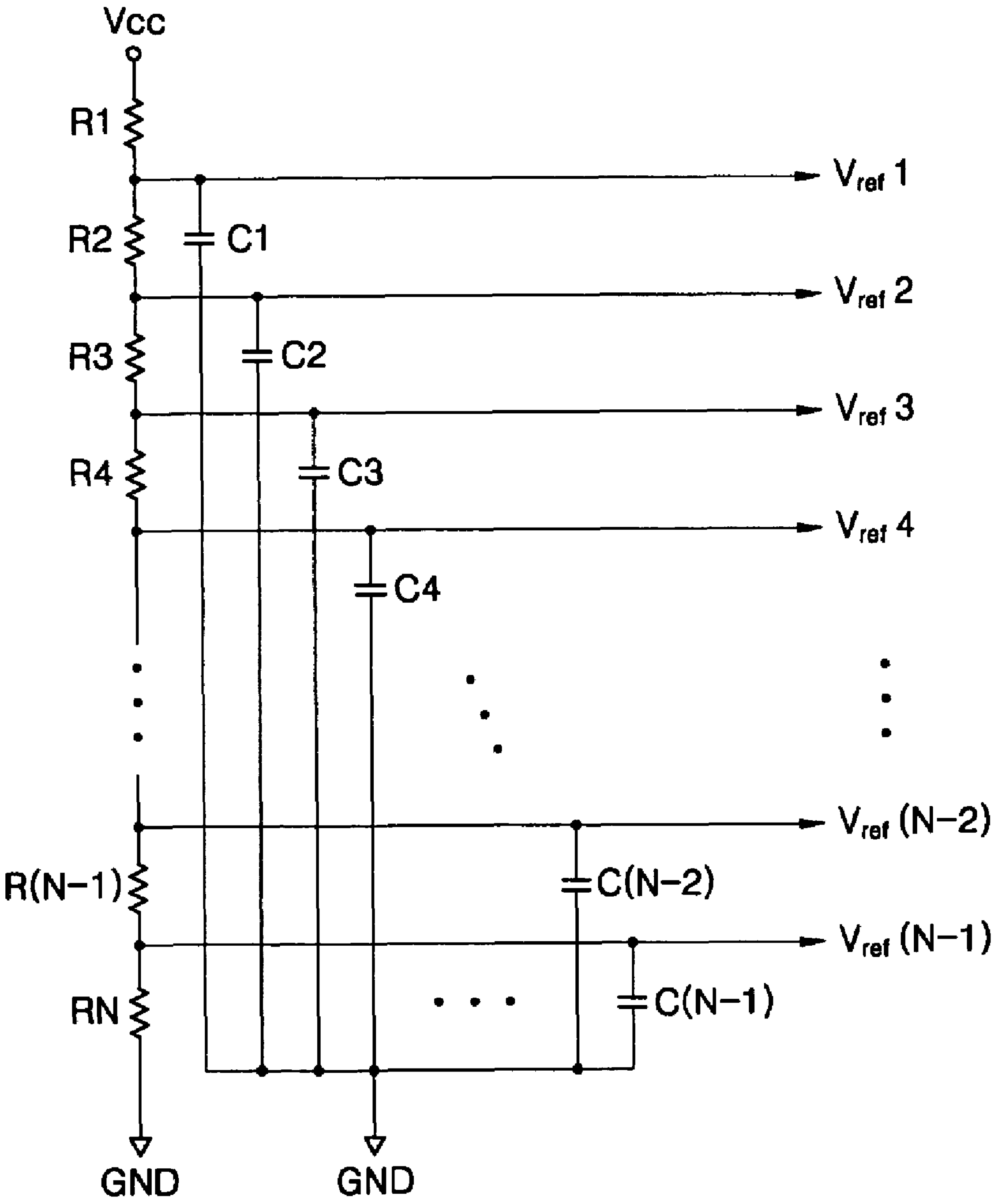
FIG. 2 (PRIOR ART)
FIG. 2 is a circuit diagram that illustrates an example of a conventional gamma reference voltage generating circuit.
Figure 3:
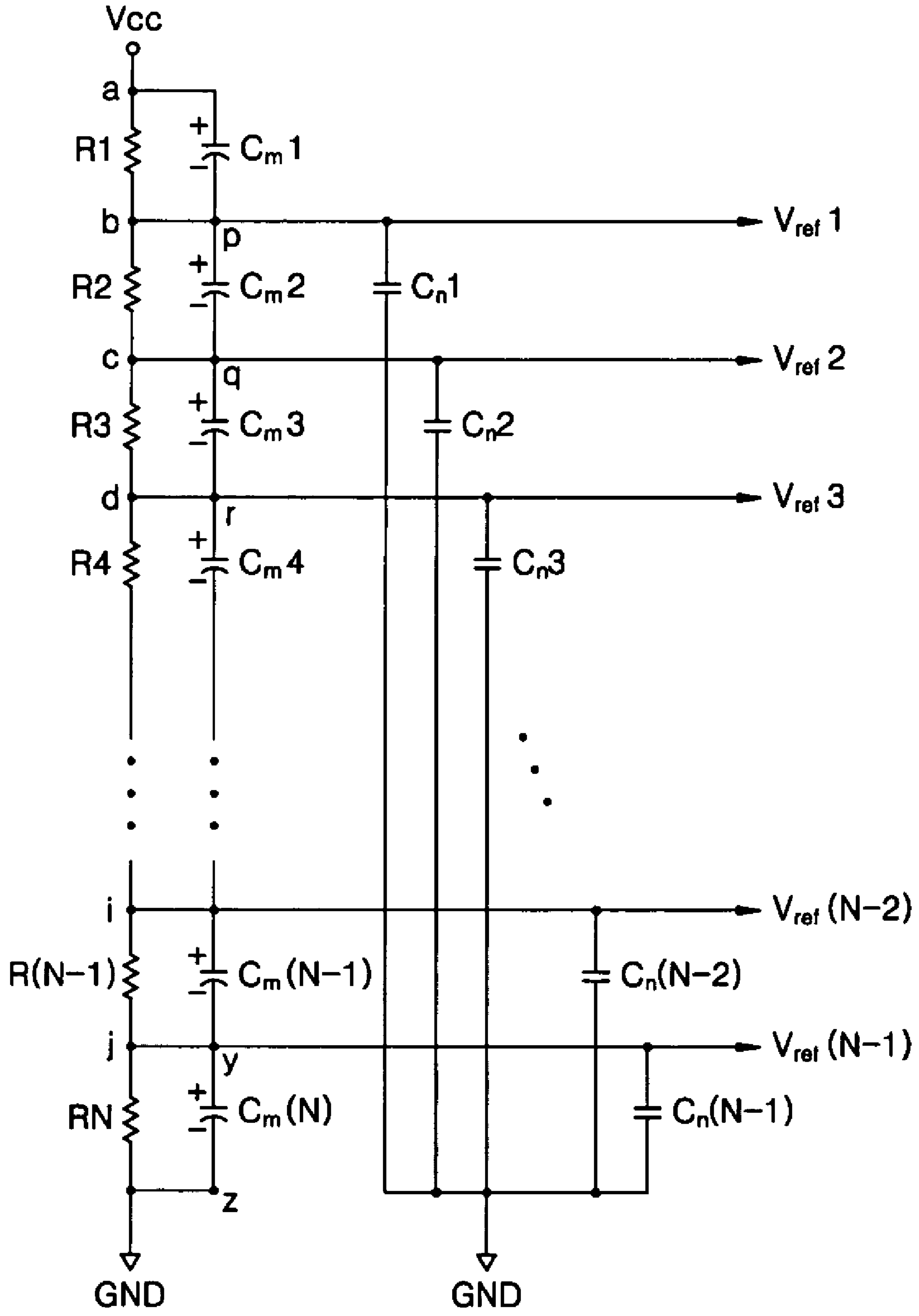
FIG. 3 is a circuit diagram of a gamma reference voltage generating circuit according to an exemplary embodiment of the present invention.

FIG. 3 is a circuit diagram of a gamma reference voltage generating circuit according to an exemplary embodiment of the present invention.

Referring to FIG. 3, the gamma reference voltage generating circuit includes a resistor array in which a plurality of resistors R1 through RN are connected in series between two supply voltages with different voltages. Here, the two supply voltages may be a first supply voltage Vcc with a high voltage level and a second supply voltage GND with a low voltage level. The second supply voltage GND may be a ground voltage.

The resistor array is also connected to a plurality of first capacitors $C_n$1 through $C_n$(N-1). The first capacitors $C_n$1 through $C_n$(N-1) are respectively connected between common nodes that are disposed between pairs of adjacent resistors R1 through RN, respectively, and one of the two supply voltages. The supply voltage connected to the first capacitors may be the second supply voltage GND.

A plurality of capacitive devices are connected in parallel to the resistors R1 through RN, respectively. In the present embodiment, the capacitive devices may be capacitors referred to as second capacitors $C_m$1 through $C_m$(N).

In the gamma reference voltage generating circuit constructed as described above, a voltage between the first supply voltage Vcc and the second supply voltage GND is divided into smaller voltages by the resistors R1 through RN that are connected in series between the two supply voltages Vcc and GND.

Referring to FIG. 3, the capacitor $C_n$1 of the first capacitors stores a voltage between a common node b between resistors R1 and R2, and the second supply voltage GND. The capacitor $C_n$2 of the first capacitors stores a voltage between a common node c between resistors R2 and R3, and the second supply voltage GND. Similarly, the (n−1)-th capacitor $C_n$(N-1) of the first capacitors stores a voltage between a common node j between resistors R(N-1) and RN, and the second supply voltage GND.

The second capacitors $C_m$1 through $C_m$(N) store voltages that are divided by the resistors R1 through RN, respectively, of the resistor array. That is, the capacitor $C_m$1 of the second capacitors stores a voltage between the nodes a and b, divided by resistor R1. The capacitor $C_m$2 of the second capacitors stores a voltage between the nodes b and c, divided by resistor R2. Similarly, the N-th capacitor $C_m$(N) stores a voltage between the node j and the supply voltage GND, divided by resistor RN.

In FIG. 3, the voltage between the two supply voltages Vcc and GND is divided into smaller voltages by the plurality of resistors R1 through RN that are connected in series between the supply voltages Vcc and GND. These divided voltages are output as gamma reference voltages to the outside. However, due to the resistance load of a receiver that receives the gamma reference voltages, the gamma reference voltages may become unstable, causing fluctuation, for example.

For this reason, a plurality of capacitors are used to prevent the gamma reference voltage generating circuit from outputting unstable gamma reference voltages, as described above. In particular, by connecting the first capacitors $C_n$1 through $C_n$(N-1) and the second capacitors $C_m$1 through $C_m$(N) to the resistor array R1 through RN, respectively, the gamma reference voltages divided by the resistors R1 through RN may be stabilized.

In general, if a capacitor C is connected in parallel to a predetermined resistor R, the capacitor C stores a voltage divided by the resistor R, wherein the capacitor C has a time constant RC for charging. Since the voltage that is stored in the capacitor C gradually rises according to the time constant RC, the time in which the voltage divided by the resistor R is charged is proportional to the capacitance of the capacitor C.

The gamma reference voltage generating circuit of the present invention outputs gamma reference voltages $V_{ref}$1 through $V_{ref}$(N-1) to the outside via output terminals that are respectively connected to common nodes that are disposed between pairs of adjacent resistors R1 through RN, respectively.

The capacitor $C_n$1 of the first capacitors stores a voltage between a common node b between the first resistor R1 and the second resistor R2, and the second supply voltage GND (a ground voltage, for example). Here, the capacitor $C_n$1 stores a voltage with a gradual slope based on a predetermined time constant RC. This prevents the fluctuation of an output gamma reference voltage $V_{ref}$1 and to instead output a stable gamma reference voltage $V_{ref}$1.

Likewise, the capacitors $C_n$2 through $C_n$(N-1) respectively store voltages between common nodes that are disposed between pairs of adjacent resistors R2 through RN, and the ground voltage GND. These capacitors can stabilize gamma reference voltages $V_{ref}$2 through $V_{ref}$(N-1) that are to be output to the outside.

In the gamma reference voltage generating circuit of the present invention, since the plurality of resistors R1 through RN are connected in parallel with the second capacitors $C_m$1 through $C_m$(N), respectively, the voltages of the common nodes p through z of the second capacitors $C_m$1 through $C_m$(N) are respectively stored in the first capacitors $C_n$1 through $C_n$(N-1).

Accordingly, the voltages divided by the resistors R1 through RN are stored with a gradual slope by the second capacitors $C_m$1 through $C_m$(N). Also, since the first capacitors $C_n$1 through $C_n$(N-1) store stable voltages between the common nodes p through z, respectively, and the ground voltage GND, the output gamma reference voltages $V_{ref}$1 through $V_{ref}$(N-1) may be stabilized further.

The second capacitors $C_m$1 through $C_m$(N) may have capacitances that are greater than the first capacitors $C_n$1 through $C_n$(N-1), respectively. By increasing the time constant RC of the gamma reference voltage generating circuit comprising resistors R1 through RN and capacitors $C_n1$ through $C_n(N-1)$ and $C_m1$ through $C_m(N)$, the stability of the gamma reference voltages $V_{ref}1$ through $V_{ref}(N-1)$ may improve further. In the present embodiment, the first capacitors $C_n1$ through $C_n(N-1)$ are set to about 1 uF and the second capacitors $C_m1$ through $C_m(N)$ are set to about 10 uF.

The resistances of resistors R1 through RN that are included in the gamma reference voltage generating circuit may be substantially the same. This is because uniformly dividing the voltage between the two supply voltages Vcc and GND allows an image display including the gamma reference voltage generating circuit to uniformly represent multiple gray-levels.

Similarly, the capacitances of the first capacitors $C_n1$ through $C_n(N-1)$ may be substantially the same. The capacitances of the second capacitors $C_m1$ through $C_m(N)$ may also be set to substantially the same value. Thus, the gamma reference voltages $V_{ref}1$ through $V_{ref}(N-1)$ output through the output terminals will have the uniform stability.

The second capacitors $C_m1$ through $C_m(N)$ may have a polarity. Since small AC components in a DC voltage are significantly removed by using capacitors with polarity, the gamma reference voltages $V_{ref}1$ through $V_{ref}(N-1)$ may be stabilized further.

Now, a flat panel display according to the present invention will be described below with reference to FIG. 4 and FIG. 5.

Figure 4:
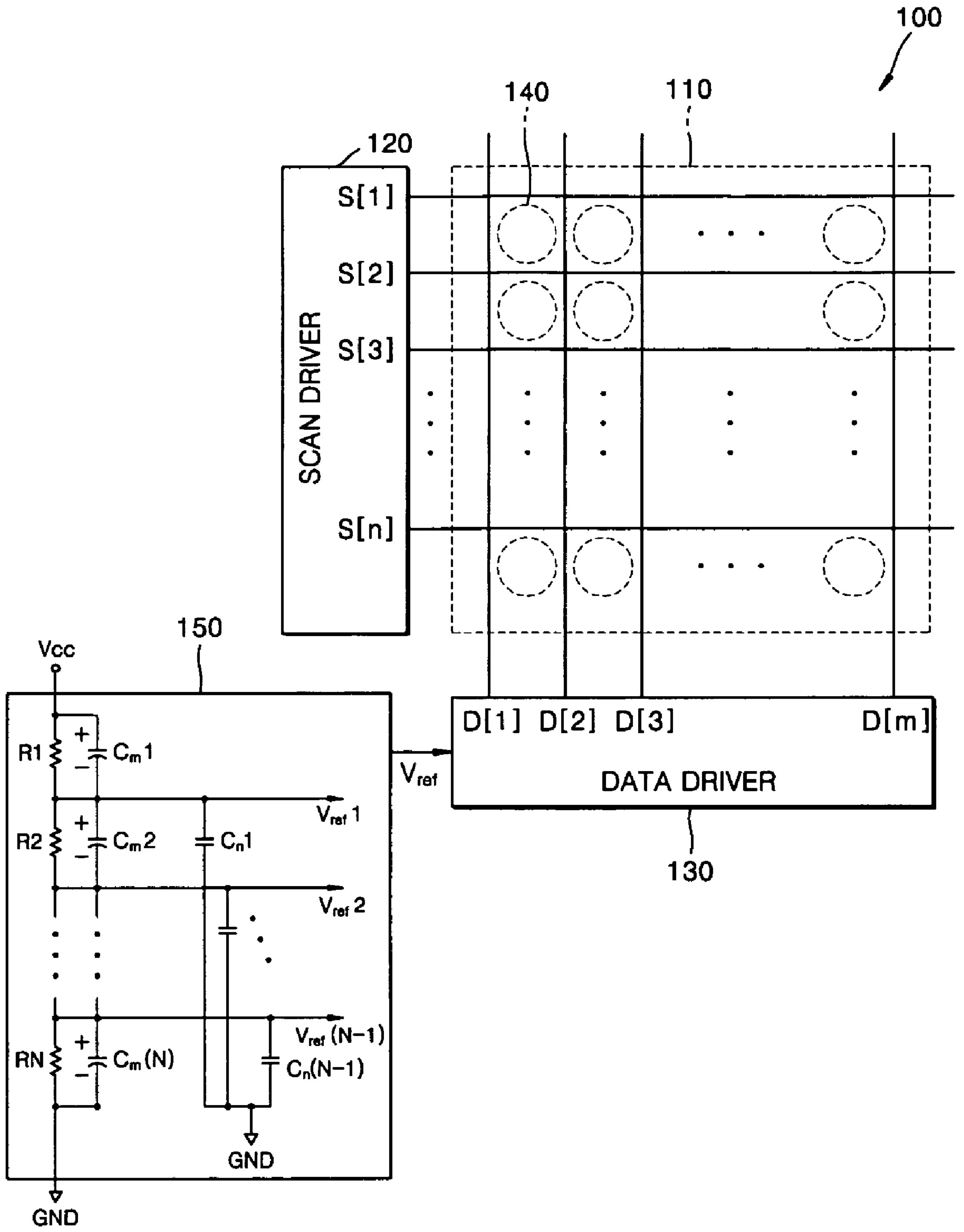
FIG. 4 illustrates a flat panel display according to an exemplary embodiment of the present invention.

FIG. 4 illustrates a flat panel display 100 according to an exemplary embodiment of the present invention. Specifically, FIG. 4 shows how a gamma reference voltage generating circuit 150 according to the present invention may be used for an organic light emitting display (organic EL). However, the gamma reference voltage generating circuit 150 of the present invention may also be used for any flat panel displays that output data signals to drive a panel using gamma reference voltages.

Referring to FIG. 4, the flat panel display 100 includes a plurality of pixels, pixel circuits 140 formed in the pixel regions, and a display panel 110 for displaying gray-levels corresponding to data signals that are transmitted to the pixel circuits 140.

Also, a plurality of scan lines are arranged in a horizontal direction and a plurality of data lines for transmitting data signals are arranged in a vertical direction on the display panel 110.

A scan driver 120 outputs scan signals S[1] through S[n] to the display panel 110 through the scan lines to select a portion of the pixels constituting the display panel 110 in each line.

A data driver 130 outputs data signals D[1] through D[m] with gray-level information to the display panel 110 through the data lines. The data signals D[1] through D[m] are transmitted to the pixels that are selected by the scan signals S[1] through S[n]. Predetermined supply voltage lines (not shown) are formed on the display panel 110 in order to supply a predetermined voltage to the pixel circuits 140.

The flat panel display 100 includes a gamma reference voltage generating circuit 150 that generates gamma reference voltages to drive the display panel 110 using gamma-corrected data signals. The gamma reference voltage generating circuit 150 divides a voltage between two supply voltages into smaller voltages through a plurality of resistors R1 through RN, and outputs the divided voltages as gamma reference voltages to the data drive 130. The gamma reference voltage generating circuit 150 includes a plurality of capacitive devices that prevent voltage fluctuation and output stable gamma reference voltages.

The capacitive devices may be capacitors with a predetermined capacitance, for example.

The two supply voltages may be a first supply voltage Vcc with a high voltage level and a second supply voltage GND with a low voltage level. The second supply voltage GND may be a ground voltage.

The capacitors include a plurality of first capacitors $C_n1$ through $C_n(N-1)$, which are connected between common nodes that are disposed between pairs of adjacent resistors R1 through RN, respectively, and the lower supply voltage GND.

The gamma reference voltage generating circuit 150 includes a plurality of second capacitors $C_m1$ through $C_m(N)$ that are connected in parallel to the resistors R1 through RN, respectively.

The gamma reference voltage generating circuit 150 included in the flat panel display as shown in FIG. 4 operates in the same manner as the gamma reference voltage generating circuit shown in FIG. 3, and may output stable gamma reference voltages $V_{ref}1$ through $V_{ref}(N-1)$.

Figure 5:
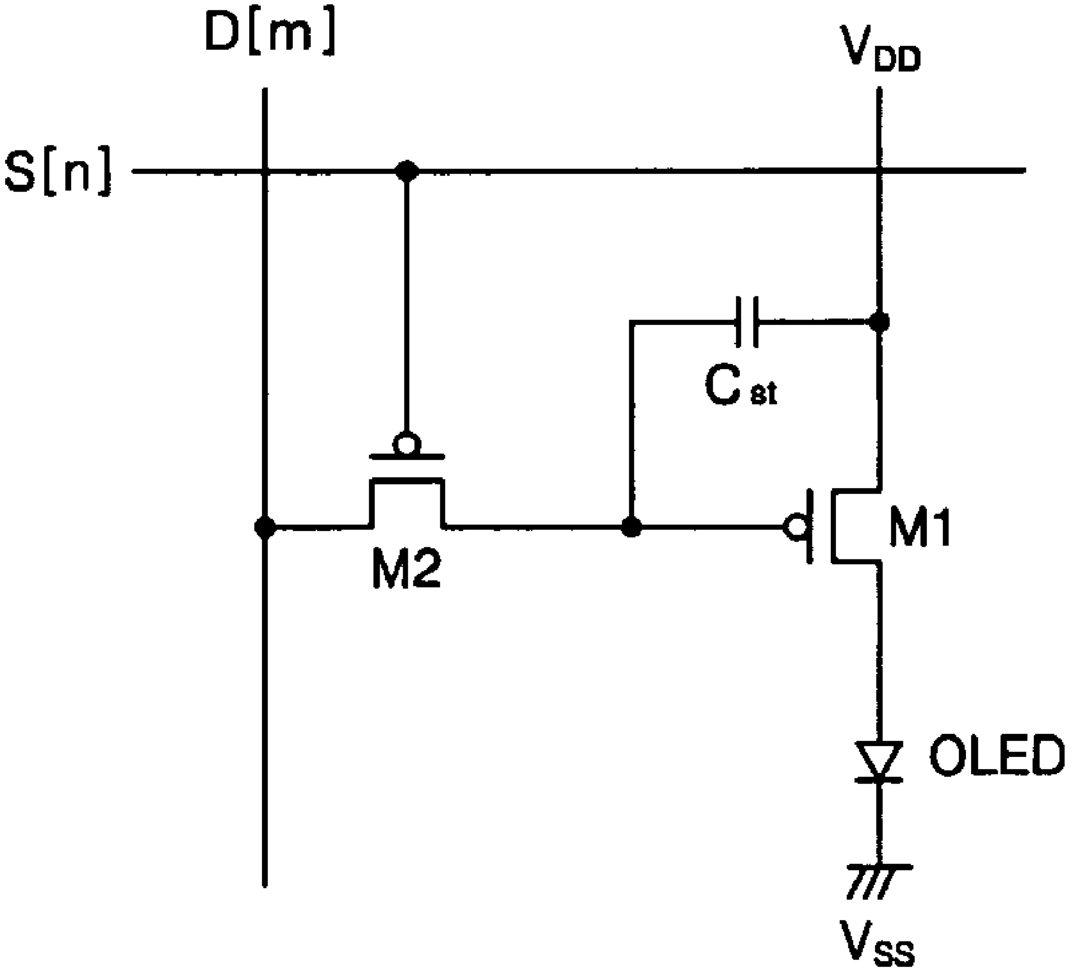
FIG. 5 is a circuit diagram of an exemplary pixel circuit formed in a pixel region shown in FIG. 4.

FIG. 5 is a circuit diagram of an exemplary pixel circuit formed in the pixel region shown in FIG. 4, wherein the types and number of components, wiring connections, etc. of the pixel circuit may be modified to suit the operation and characteristics of the flat panel display 100.

Referring to FIG. 5, the pixel circuit includes an organic light-emitting device (OLED), first transistor M1, second transistor M2, and a capacitor $C_{st}$.

The first transistor M1 is a driving transistor and the second transistor M2 is a switching transistor. The first transistor M1 and the second transistors M2 may be thin film transistors (TFTs). The first electrode of the second transistor M2 is connected to a data line and the main electrode of the second transistor M2 receives a scan signal S[n]. The second transistor M2 is turned on/off in response to the scan signal S[n]. If the transistors M1 and M2 are PMOS transistors as in FIG. 5, the second transistor M2 is turned on in response to a low scan signal S[n]. If the second transistor M2 is turned on, a data signal D[m] is applied to the pixel circuit 140 through the data line.

The capacitor $C_{st}$ is connected between the first electrode and main electrode of the first transistor M1, and maintains a data voltage $V_{data}$ corresponding to a data signal supplied from the second transistor M2, for a predetermined time. Also, the first transistor M1 supplies current created by a voltage between the terminals of the capacitor $C_{st}$ to the OLED.

Since the voltage between both the terminals of the capacitor $C_{st}$ depends on a predetermined supply voltage $V_{DD}$ and the data voltage $V_{data}$, if the data signal applied to the pixel circuit 150 is unstable, an error can be generated when representing gray-levels on the display.

Accordingly, as shown in FIG. 4, by including a gamma reference voltage generating circuit that stabilizes gamma reference voltages in a flat panel display, the probability of error generation due to an unstable data signal when representing gray-levels may be reduced efficiently.

As described above, the resistances of the resistors R1 through RN included in the gamma reference voltage generating circuit 150 may be substantially the same.

Further, by setting the capacitances of the first or second capacitors $C_n1$ through $C_n(N-1)$ or $C_m1$ through $C_m(N)$ to substantially the same value, the gamma reference voltages $V_{ref}1$ through $V_{ref}(N-1)$ output through the output terminals may have the same stability. Thus, the flat panel display 100 including the gamma reference voltage generating circuit 150 can uniformly represent multiple gray-levels.

Alternately, the capacitances of the second capacitors $C_m1$ through $C_m(N)$ may be greater than those of the first capacitors $C_n1$ through $C_n(N-1)$. The second capacitors $C_m1$ through $C_m(N)$ may have a polarity.

Figure 6:
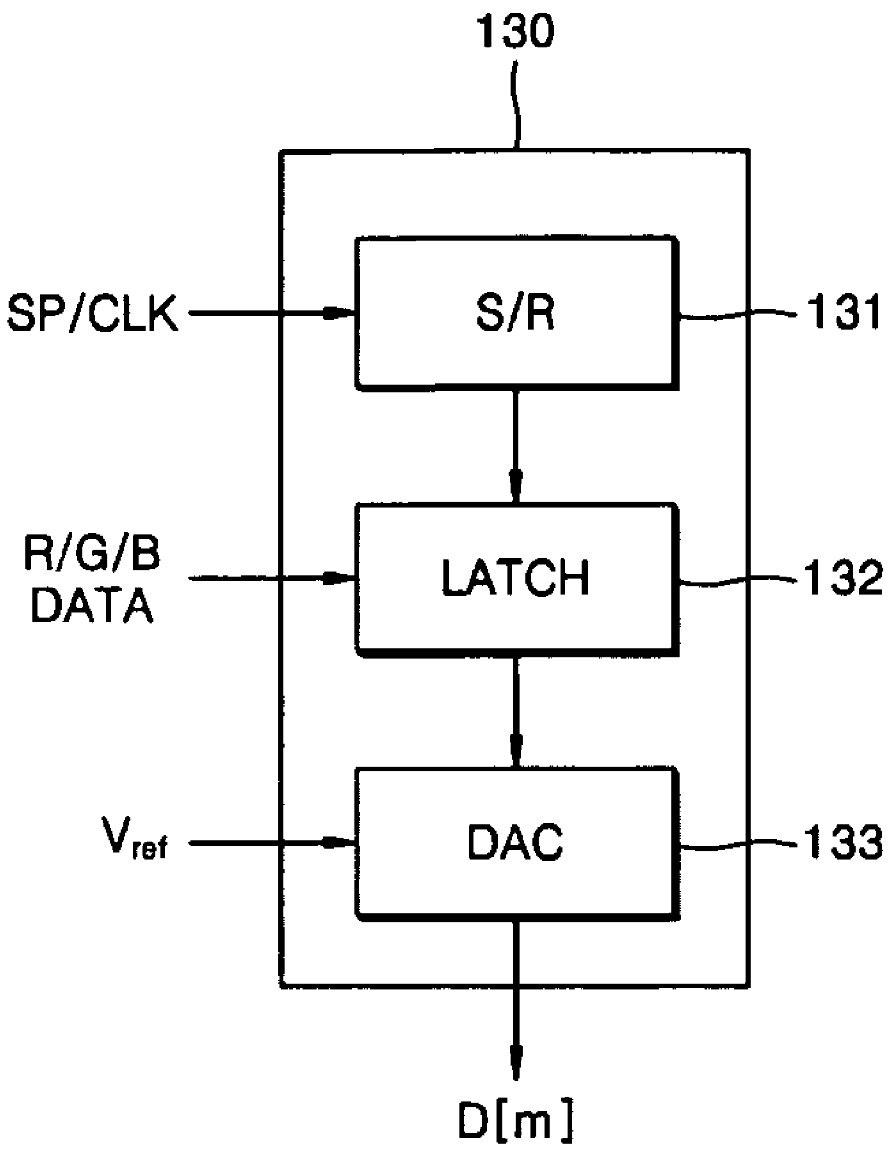
FIG. 6 is a block diagram of a data driver shown in FIG. 4.
Figure 7:
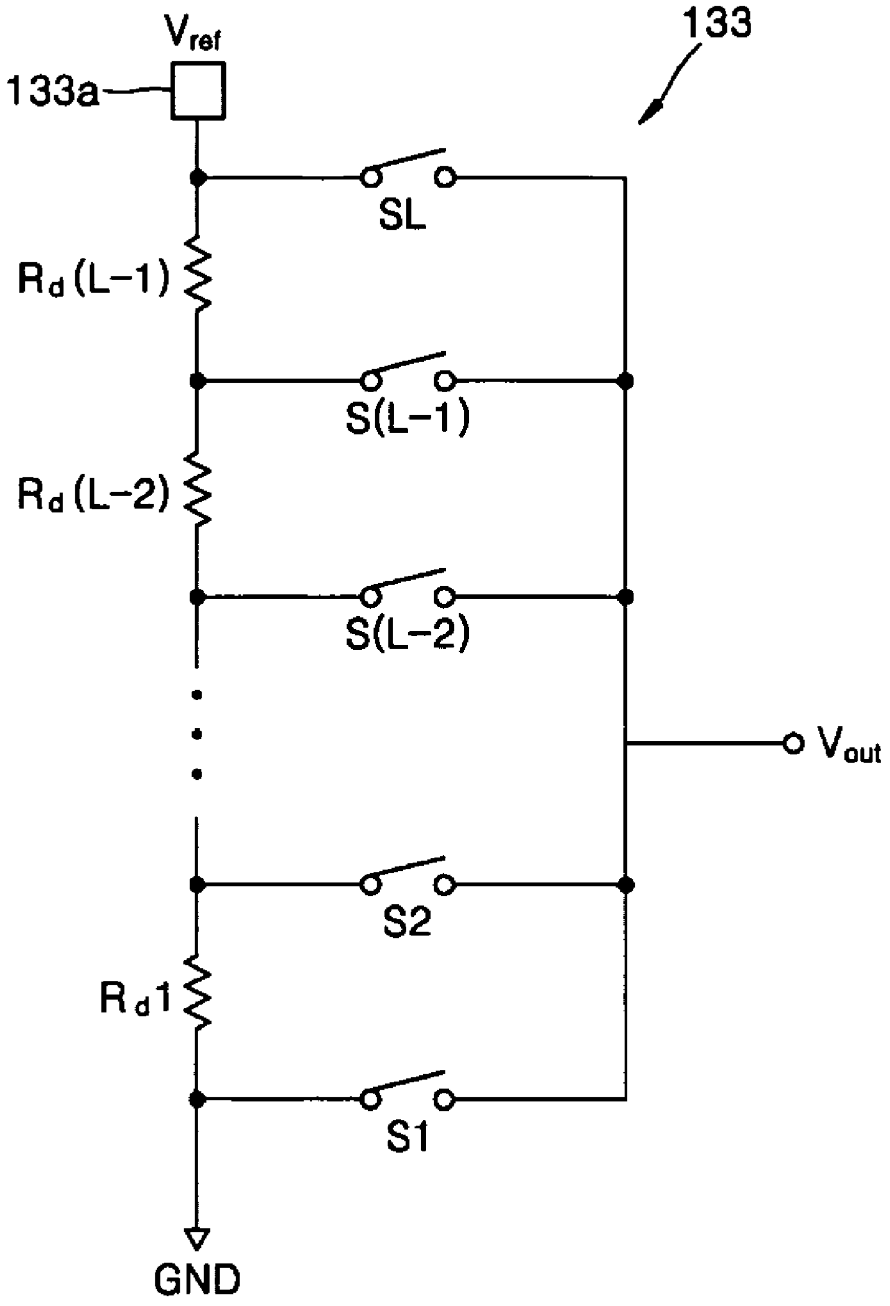
FIG. 7 is a circuit diagram of a D/A converter shown in FIG. 6.

A data driver that stabilizes and outputs gamma reference voltages $V_{ref}1$ through $V_{ref}(N-1)$ and a D/A converter included in the data driver will be described with reference to FIG. 6 and FIG. 7. FIG. 6 is a block diagram of the data driver 130 shown in FIG. 4, and FIG. 7 is a circuit diagram of a D/A converter (DAC) 133 shown in FIG. 6.

Referring to FIG. 6, the data driver 130 receives gray-level data (R/G/B data) and a gamma reference voltage $V_{ref}$ generated by the gamma reference voltage generating circuit 150 and outputs a data signal D[m] to drive the display panel 110 (see FIG. 4). The data driver 130 includes the DAC 133 that converts a digital signal into an analog signal and the gamma reference voltage generating circuit 150 outputs the gamma reference voltage $V_{ref}$ to the D/A converter 133 included in the data driver 130.

The data driver 130 further includes a shift register 131 that sequentially shifts and outputs a start signal SP in synchronization with a clock signal CLK. In addition, a latch 132 outputs the gray-level data in synchronization with a signal output from the shift register 131.

The DAC 133 receives the gamma reference voltage $V_{ref}$ and a digital gray-level signal, converts the digital gray-level signal into an analog data signal D[m], and outputs the converted data signal D[m] to the display panel 110 (see FIG. 4).

Referring to FIG. 7, the DAC 133 includes a resistor array comprising a plurality of resistors $R_d1$ through $R_d(L-1)$ that are connected in series between the gamma reference voltage $V_{ref}$ and the second voltage GND. The voltage between the gamma reference voltage $V_{ref}$ and the second voltage GND is divided into smaller voltages by the resistors $R_d1$ through $R_d(L-1)$.

Also, the DAC 133 includes a plurality of switches S1 through SL that selectively output the voltages that are divided by the resistors $R_d1$ through $R_d(L-1)$ to the outside, in response to the digital R/G/B data. The switches S1 through SL select a specific voltage divided by the resistors $R_d1$ through $R_d(L-1)$ depending on the predetermined gray-level data, thus performing D/A conversion.

The DAC 133 receives the gamma reference voltage $V_{ref}$ output from the gamma reference voltage generating circuit 150 through the gamma reference voltage receiver 133*a*, as shown in FIG. 7. Since the gamma reference voltage receiver 133*a* is connected to the resistor array, the gamma reference voltage $V_{ref}$ may fluctuate due to the resistance load. Specifically, when a data signal undergoes D/A conversion, the fluctuation is more significant in lower bits operating at high speed, which deteriorates the picture quality of an image.

Therefore, according to the present invention as described above, by connecting first capacitors and second capacitors to a resistor array included in a gamma reference voltage generating circuit to stabilize gamma reference voltages, data signals to be applied to a display panel may be stabilized and may efficiently reduce the probability of error generation when gray-levels are represented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A gamma reference voltage generating circuit, comprising:

a resistor array that comprises a plurality of resistors that are connected in series between two supply voltages with different voltage levels;

a plurality of first capacitors that are respectively connected between common nodes that are disposed between pairs of adjacent resistors and one of the two supply voltages; and a plurality of second capacitors that are connected in parallel to the respective resistors to stabilize the gamma reference voltages;

wherein the resistor array divides a voltage between the two supply voltages through the plurality of resistors and outputs the divided voltages.

2. The gamma reference voltage generating circuit of claim 1, wherein the plurality of first capacitors are connected between the common nodes that are disposed between the pairs of adjacent resistors, respectively, and the lesser of the two supply voltages.

3. The gamma reference voltage generating circuit of claim 2, wherein the resistances of the resistors are substantially the same.

4. The gamma reference voltage generating circuit of claim 2, wherein the capacitances of the first capacitors are substantially the same.

5. The gamma reference voltage generating circuit of claim 2, wherein the capacitances of the second capacitors are substantially the same.

6. The gamma reference voltage generating circuit of claim 2, wherein the capacitances of the second capacitors are greater than those of the first capacitors.

7. The gamma reference voltage generating circuit of claim 2, wherein the second capacitors have polarity.

8. A display, comprising:

a display panel comprising a plurality of pixels and pixel circuits that are respectively formed in a pixel region to represent gray-levels according to data signals that are transferred to the pixel circuits; and a gamma reference voltage generating circuit that generates a gamma reference voltage to drive the display panel according to a gamma-corrected data signal; and a data driver that receives the gamma reference voltage and gray-level data and outputs a data signal for driving the display panel, wherein the gamma reference voltage generating circuit comprises:

a resistor array that includes a plurality of resistors that are connected in series between two supply voltages with different voltage levels, divides a voltage between the two supply voltages through the plurality of resistors, and outputs the divided voltages;

a plurality of first capacitors that are connected between common nodes that are disposed between pairs of adjacent resistors, respectively, and one of the two supply voltages; and a plurality of second capacitors that are connected in parallel to the respective resistors to stabilize the gamma reference voltages.

9. The display of claim 8, wherein the plurality of first capacitors are connected between the common nodes that are disposed between pairs of adjacent resistors, respectively, and the lesser of the two supply voltages.

10. The display of claim 9, wherein the resistances of the plurality of resistors are substantially the same.

11. The display of claim 9, wherein the capacitances of the plurality of first capacitors are substantially the same.

12. The display of claim 9, wherein the capacitances of the plurality of second capacitors are substantially the same.

13. The display of claim 9, wherein the capacitances of the plurality of second capacitors are greater than those of the plurality of first capacitors.

14. The display of claim 9, wherein the second capacitors have polarity.

15. The display of claim 8, wherein the data driver comprises a digital-to-analog (D/A) converter that converts a digital signal into an analog signal and the gamma reference voltage generating circuit that outputs the gamma reference voltage to the D/A converter.

16. The display of claim 15, wherein the D/A converter further comprises a gamma reference voltage receiver.

17. The display of claim 16, wherein the data driver further comprises:

a shift register that sequentially shifts and outputs a start signal in synchronization with a clock signal; and a latch that outputs gray-level data in synchronization with a signal output from the shift register.

18. The display of claim 17, wherein the D/A converter comprises:

a resistor array that comprises a plurality of resistors that are connected in series between a first supply voltage and a second supply voltage; and a plurality of switches that are connected to common nodes that are disposed between pairs of adjacent resistors in the resistor array of the D/A converter, respectively, to select voltages that are divided by the respective resistors.

19. The display of claim 18, wherein the first supply voltage is a gamma reference voltage that is received from the gamma reference voltage receiver.

20. The display of claim 8, wherein the display panel is an organic light emitting display.

* * * * *

UNITED STATES PATENT AND TRADEMARK OFFICE

CERTIFICATE OF CORRECTION

PATENT NO. : 7,629,950 B2
APPLICATION NO. : 11/311692
DATED : December 8, 2009
INVENTOR(S) : Young-Wook Yoo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Second Day of November, 2010

David J. Kappos

*Director of the United States Patent and Trademark Office*